(12) United States Patent
Hirata

(10) Patent No.: US 7,759,889 B2
(45) Date of Patent: Jul. 20, 2010

(54) MOTOR DRIVE DEVICE AND ELECTRIC APPARATUS USING THE SAME

(75) Inventor: Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 310 days.

(21) Appl. No.: 12/042,526

(22) Filed: Mar. 5, 2008

(65) Prior Publication Data

US 2008/0219649 A1    Sep. 11, 2008

(30) Foreign Application Priority Data

Mar. 6, 2007    (JP)    ............... 2007-055821

(51) Int. Cl.
*H02P 6/08*    (2006.01)
(52) U.S. Cl. ............. 318/400.29; 388/811; 318/400.13; 318/430; 318/473; 417/423.7
(58) Field of Classification Search ............ 318/400.13, 318/400.28, 400.29, 430, 473; 388/811; 417/423.7
See application file for complete search history.

(56) References Cited

U.S. PATENT DOCUMENTS

| 7,112,937 | B1 | 9/2006 | Stemple et al. | |
| 7,208,893 | B2* | 4/2007 | Furuki | 318/400.01 |
| 7,239,200 | B2* | 7/2007 | Ishii et al. | 330/10 |
| 7,265,523 | B2* | 9/2007 | Dowlatabadi | 323/222 |
| 2004/0212356 | A1* | 10/2004 | Dowlatabadi | 323/282 |
| 2006/0132231 | A1* | 6/2006 | Ishii et al. | 330/10 |
| 2007/0090812 | A1* | 4/2007 | Dowlatabadi | 323/222 |
| 2007/0273324 | A1 | 11/2007 | Fujimura | |
| 2008/0088268 | A1* | 4/2008 | Sakaguchi | 318/471 |
| 2008/0107408 | A1* | 5/2008 | Sugie | 388/815 |
| 2009/0066280 | A1* | 3/2009 | Hayashi | 318/430 |
| 2009/0096402 | A1* | 4/2009 | Miyajima et al. | 318/473 |
| 2009/0153084 | A1* | 6/2009 | Mishima et al. | 318/400.13 |
| 2009/0167219 | A1* | 7/2009 | Imai et al. | 318/400.11 |
| 2009/0184672 | A1* | 7/2009 | Suzuki | 318/400.13 |
| 2009/0212729 | A1* | 8/2009 | Cook | 318/474 |
| 2009/0261764 | A1* | 10/2009 | Hirata | 318/400.29 |
| 2009/0273738 | A1* | 11/2009 | Fukumoto | 349/70 |
| 2009/0284197 | A1* | 11/2009 | Sugie | 318/400.13 |

FOREIGN PATENT DOCUMENTS

| JP | 06-245573 | 9/1994 |
| JP | 2002-223363 | 8/2002 |
| JP | 3665565 | 4/2005 |
| JP | 2006-42423 | 2/2006 |

* cited by examiner

*Primary Examiner*—Paul Ip
(74) *Attorney, Agent, or Firm*—Fish & Richardson P.C.

(57) ABSTRACT

A motor drive device of the present invention includes: an output circuit provided with a switch element connected to a motor; a PWM signal generating circuit for generating a PWM signal having a duty corresponding to a ratio between a power supply voltage applied to the motor and a predetermined control voltage; a control circuit for performing on/off control of the switch element according to the PWM signal; and a control voltage generating circuit for generating the control voltage such that the back electromotive voltage of the motor is maintained at a desired value.

19 Claims, 14 Drawing Sheets

FIG. 4

| | | | | |
|---|---|---|---|---|
| FIN | H | L | H | L |
| RIN | L | H | H | L |
| QH1 | PWM | OFF | OFF | OFF |
| QH2 | OFF | PWM | OFF | OFF |
| QL1 | OFF | ON | ON | OFF |
| QL2 | ON | OFF | ON | OFF |
| MODE | (a) FORWARD ROTATION | (b) REVERSE ROTATION | (c) BRAKE | (d) IDLE RUNNING |

OPERATION MODE
CONTROL SIGNAL

MOTOR DRIVE DEVICE AND ELECTRIC APPARATUS USING THE SAME

This application is based on Japanese Patent Application No. 2007-055821 filed on Mar. 6, 2007, the contents of which are hereby incorporated by reference.

BACKGROUND OF THE INVENTION

1. Field of the Invention

The present invention relates to a motor drive device for controlling the driving of a motor, and to an electric apparatus using the same.

2. Description of Related Art

In a motor drive device for controlling the driving of a motor, in order to set the rotation speed of the motor to a desired value, a drive voltage applied to one end of a motor coil (and thus a drive current flowing through the motor coil) needs to be controlled to be a desired value.

Accordingly, conventional motor drive devices have commonly adopted a configuration in which, as shown in FIG. 13, bipolar transistors Tr1 to Tr4 are used as switch elements in an H-bridge circuit, and that is provided with transistors Tra and Trb and constant current sources Ia and Ib for controlling the base currents of upper-side transistors Tr1 and Tr2 according to a control voltage Vref externally applied as a drive voltage setting signal, thereby a drive voltage applied to one end of a motor coil L (and thus a drive current flowing through the motor coil L) being controlled to be a desired value (a so-called dropper-type regulator configuration). A control circuit CNT in FIG. 13 controls the on/off states of the transistors Tr1 to Tr4 (i.e., the operation mode of the motor) according to the logics of externally fed operation mode control signals FIN and RIN (binary signals).

In the motor drive device configured as described above, while the upper-side transistor Tr1 (Tr2) is kept on, a drive voltage (a voltage having approximately the same value as the control voltage Vref) obtained by raising the control voltage Vref only by the value of 1Vf of the transistor Tra (Trb) and then dropping the control voltage Vref only by the value of 1Vf of the transistor Tr1 (Tr2) is applied to the one end of the motor coil L.

As other conventional arts related to the present invention, there have been disclosed and proposed: a motor drive control system in which field effect transistors are used as switch elements in an H-bridge circuit and gate voltages of the transistors are controlled by pulse width modulation control (hereinafter referred to as PWM (pulse width modulation) control) (see JP-B2-3665565 (hereinafter referred to as Patent Publication 1)); and an art in which, with respect to a triangular wave generating circuit that outputs the charge/discharge voltage of a capacitor as a triangular wave, the frequency of the triangular wave is maintained at a predetermined frequency by controlling such that the amplitude of the triangular wave is reduced with reduction of the power supply voltage, and further, the value of a current for charging and discharging the capacitor is reduced according to this amplitude (see JP-A-2002-223563 filed by the applicant of the present application (hereinafter referred to as Patent Publication 2)).

Conventionally, as means for maintaining the rotation speed of a DC brush motor at a desired value, bridge servos (see FIG. 14A) and proportional current servos (see FIG. 14B) have been widely used.

As another conventional art related to the present invention, the applicant of the present invention has disclosed and proposed in JP-A-H06-245573 (hereinafter referred to as Patent Publication 3) an electronic-governor-type DC-motor control circuit including a resistor bridge for controlling a DC motor that drives an audio signal recording medium. This DC-motor control circuit includes a PWM-type control circuit that has a predetermined constant frequency which is beyond the audible range and whose pulse width is modulated according to the rotation state of the DC motor detected by a resistor-bridge circuit including the resistor bridge, and this control circuit switches power supplied to the DC motor so as to control the rotation speed of the DC motor.

It is true that, with a motor drive device having the conventional configuration shown in FIG. 13, it is possible to control the drive voltage applied to one end of a motor coil L (and thus the current voltage flowing through the motor coil L) to be a desired value according to a control voltage Vref, regardless of the power supply voltage Vcc, by appropriately generating the control voltage Vref by use of a resistive divider circuit or the like provided outside the device.

However, in the conventional motor drive device described above, for the purpose of maintaining proper operation of the transistor Tra (Trb), the control voltage Vref can be set, at the highest, to a voltage value given by subtracting the value of 1Vf of the transistor Tra (Trb) from the power supply voltage Vcc (in practice, an even lower voltage value determined with even the voltage drop occurring at a constant current source Ia (Ib) taken into consideration). As a result, the drive voltage that can be applied to one end of the motor coil L is lower than the power supply voltage Vcc at least by the value of 1Vf of the transistor Tra (Trb), and this prevents an effective use of the power supply voltage range.

In addition, in the conventional motor drive device described above, since the bipolar transistors Tr1 to Tr4 are used as the switch elements of the H-bridge circuit, the response of the switch elements to on/off control is not necessarily fast.

Patent Publication 1 discloses nothing more than an art in which the operation mode of a motor is selectively set by PWM driving the switch elements of an H-bridge circuit according to a drive current flowing through a motor coil, and does not disclose anything with respect to an art in which the drive voltage applied to one end of a motor coil is set to a desired value according to an externally applied control voltage.

The conventional art of Patent Publication 2 relates to a switching regulator that is PWM-driven by use of a triangular wave generated by a triangular wave generating circuit, and its main object is limited to providing a switching regulator that is capable of securely performing PWM driving according to variation in the output voltage by preventing PWM driving capability from deteriorating even when the power supply voltage is lowered and ensuring a predetermined duty ratio even when the power supply voltage is lowered. Therefore, the conventional art of Patent Publication 2 hardly helps to solve the above described problems.

As to conventional arts for maintaining the rotation speed of a DC brush motor at a desired value, the bridge servo and the proportional current servo shown in FIGS. 14a and 14B, respectively, monitor the terminal voltage of a motor M (and thus the back electromotive voltage $E_{BEMF}$ generated in proportion to the rotation speed of the motor M), and control a power supply voltage Vcc or a motor current $I_M$ such that the terminal voltage of the motor M is equal to a predetermined control voltage Vref. The bridge servo and the proportional current servo make it possible to maintain the rotation speed of the motor M at a desired value with a simple configuration, but on the other hand, they generate an inconveniently large amount of heat or consume an inconveniently large amount of power when the motor M is driven with a large current.

With the conventional art of Patent Publication 3, it is possible to substantially reduce power consumption by using a switching regulator to control the power supply voltage Vcc. However, with the conventional art of Patent Publication 3, an expensive coil is required as one of its circuit elements, and moreover, the rotation speed cannot necessarily be set easily.

The bridge servo and the proportional current servo shown in FIGS. 14A and 14B, respectively, are designed on condition that one end of the motor M is connected to a power supply line, and a couple of the above mentioned servos need to be provided in order to freely switch the rotation of the motor M between the forward and reverse rotations. This causes increase in circuit size and in cost.

SUMMARY OF THE INVENTION

In view of the above mentioned inconveniences, an object of the present invention is to provide a motor drive device that is capable of variably controlling a drive voltage applied to one end of a motor coil easily and in a wide range, and furthermore, capable of maintaining the drive voltage at a desired value, and an electric apparatus using the same.

To achieve the above object, according to the present invention, a motor drive device includes: an output circuit provided with a switch element connected to a motor; a PWM signal generating circuit for generating a PWM signal having a duty corresponding to a ratio between a power supply voltage applied to the motor and a predetermined control voltage; a control circuit for performing on/off control of the switch element according to the PWM signal; and a control voltage generating circuit for monitoring a motor current flowing through the motor, and generating the control voltage such that a back electromotive voltage of the motor is maintained at a desired value.

Other features, elements, steps, advantages and characteristics of the present invention will become more apparent from the following detailed description of preferred embodiments thereof with reference to the attached drawings.

BRIEF DESCRIPTION OF THE DRAWINGS

FIG. 4 is a diagram for illustrating operation of generating gate signals according to operation mode control signals FIN and RIN;

DETAILED DESCRIPTION OF PREFERRED EMBODIMENTS

Figure 1:
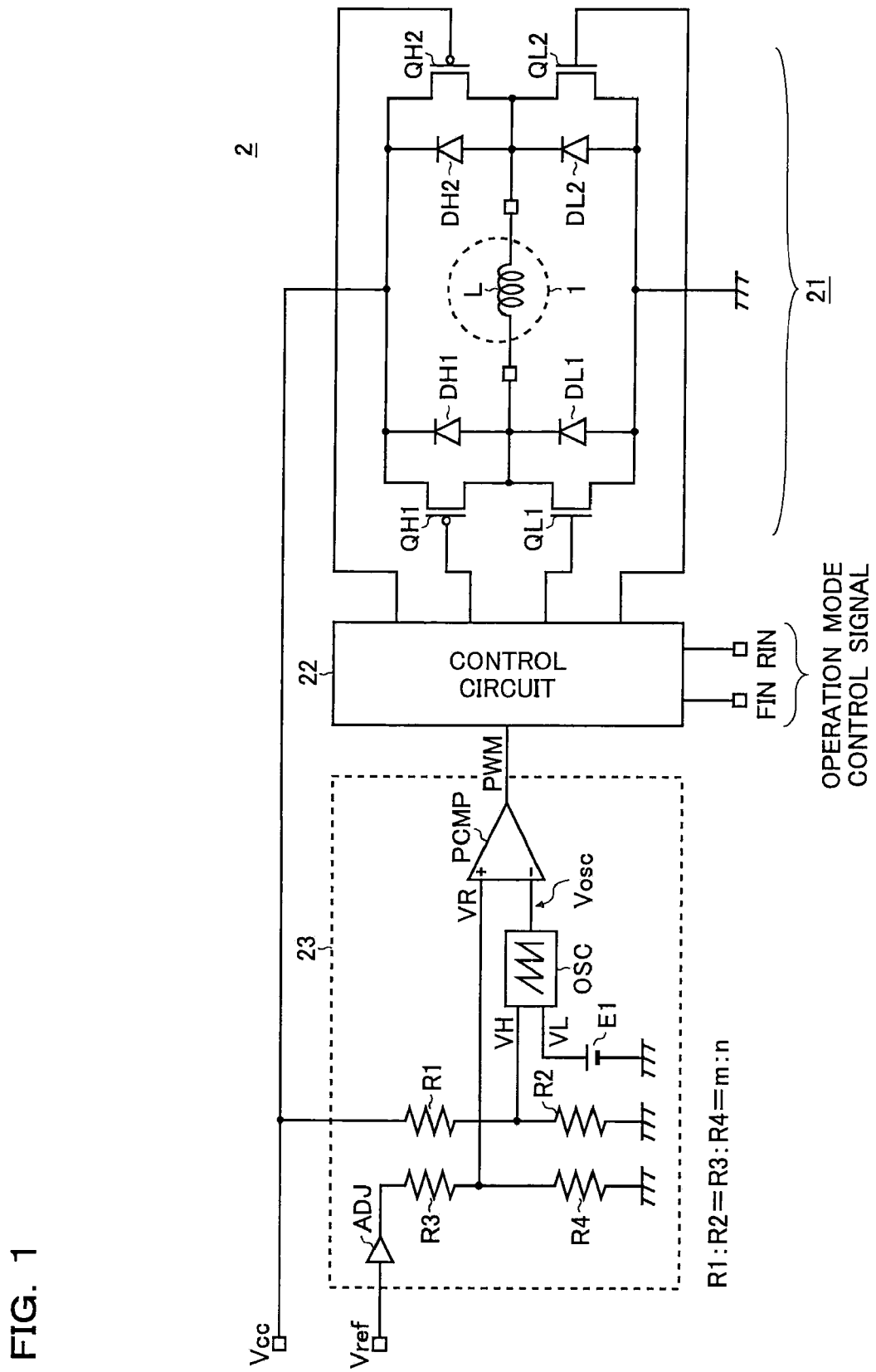
FIG. 1 is a block diagram showing a first embodiment of an electric apparatus provided with a motor drive device of the present invention.

FIG. 1 is a block diagram (partly including circuit elements) showing a first embodiment of an electric apparatus provided with a motor drive device of the present invention.

As shown in the figure, the electric apparatus of this embodiment includes a motor 1 and a motor drive device 2 for controlling the driving of the motor 1.

The motor 1 is a single-phase DC brush motor that rotates in a direction corresponding to a current passed through a motor coil L, and the operation mode of the motor 1 is switched among four different operation modes (i.e., forward rotation, reverse rotation, brake, and idle-running modes) by the motor drive device 2.

Examples of the mechanism used in electric apparatuses provided with the above-described reversible motor 1 are a tray opening-closing mechanism of a tray-type CD player, a video cassette ejecting mechanism of a video deck, an automatic paper-cutting mechanism of a printer, a focusing mechanism of a camera, and a louver opening/closing mechanism of an air conditioner, and thus the reversible motor 1 has a very wide range of application.

The motor drive device 2 includes an H-bridge circuit 21, a control circuit 22, and a PWM signal generating circuit 23.

The H-bridge circuit 21 includes four switch elements (P-channel field effect transistors QH1 and QH2, and N-channel field effect transistors QL1 and QL2) connected in an H-bridge configuration with respect to a motor coil L (a reactance load) provided in the motor 1.

A specific description will now be given of the internal configuration of the H-bridge circuit 21.

The sources of the transistors QH1 and QH2 functioning as upper-side switch elements are both connected to a power supply input terminal to which a power supply voltage Vcc is applied. The sources of the transistors QL1 and QL2 functioning as lower-side switch elements are both connected to a ground terminal. The drains of the transistors QH1 and QL1 are connected to each other, and their connection node is connected to a first output terminal to which one end of the motor coil L is connected. The drains of the transistors QH2 and QL2 are connected to each other, and their connection node is connected to a second output terminal to which the other end of the motor coil L is connected. The gates of the transistors QH1, QH2, QL1, and QL2 are each connected to a gate signal output terminal of the control circuit 22.

As shown in FIG. 1, to the transistors QH1, QH2, QL1, and QL2, diodes DH1, DH2, DL1, and DL2 are connected in parallel in the direction shown in the figure, respectively, and function as back electromotive force absorbing elements for the motor coil L. In the case where the transistors QH1, QH2, QL1, and QL2 are each accompanied by a parasitic diode, the parasitic diodes may be used as the back electromotive force absorbing elements.

The control circuit 22 mainly controls the transistors QH1, QH2, QL1, and QL2; it selects a transistor to be turned on according to the operation mode control signals FIN and RIN fed from outside the device, and also generates, for the purpose of controlling the on-duty of the selected transistor according to a PWM signal fed from the PWM signal generating circuit 23, gate signals of the transistors QH1, QH2, QL1, and QL2 according to the operation mode control signals FIN and RIN and the PWM signal (i.e., the control circuit 22 includes a section functioning as a driver or a predriver). A detailed description will be given later of the specific operation of the control circuit 22.

The PWM signal generating circuit 23 generates a PWM signal having a duty corresponding to the ratio between the power supply voltage Vcc applied to one or the other end of the motor coil L via the H-bridge circuit 21 and a control voltage Vref fed from outside the device.

A specific description will now be given of the inner configuration of the PWM signal generating circuit 23.

As shown in FIG. 1, the PWM signal generating circuit 23 includes resistors R1 to R4, an impedance converter ADJ, a direct current voltage source E1, an oscillator OSC, and a PWM comparator PCMP.

The resistors R1 and R2 are connected in series to each other between a power supply input terminal and a ground terminal, and their connection node is connected to one input terminal (an upper limit value setting terminal) of the oscillator OSC. The resistance ratio between the resistors R1 and R2 is m:n. The resistors R1 and R2 function as a first voltage divider for dividing the power supply voltage Vcc in a predetermined ratio $\alpha(=n/(m+n))$ to generate a first division voltage $VH(=\alpha \times Vcc)$.

The direct current voltage source E1 generates a predetermined reference voltage VL. A positive terminal of the direct current voltage source E1 is connected to the other input terminal (a lower limit value setting terminal) of the oscillator OSC, and a negative terminal of the direct current voltage source E1 is connected to a ground terminal.

The oscillator OSC generates an oscillation voltage Vosc having a constant oscillation frequency and a sawtooth or a triangular waveform whose amplitude varies according to the first division voltage VH, and the output terminal of the oscillator OSC is connected to an inverting input terminal (−) of the PWM comparator PCMP. A detailed description will later be given of the specific configuration and operation of the oscillator OSC.

The resistors R3 and R4 are connected to each other in series between a terminal to which the control voltage Vref is inputted (control voltage input terminal) and a ground terminal via the impedance converter ADJ, and their connection node is connected to a non-inverting input terminal (+) of the PWM comparator PCMP. The resistance ratio between the resistors R3 and R4 is m:n. The resistors R3 and R4 function as a second voltage divider for dividing the control voltage Vref in a predetermined ratio $\alpha(=n/(m+n))$ to generate a second division voltage VR $(=\alpha \times Vref)$.

The impedance converter ADJ matches the impedance between the input and output thereof, functioning as a buffer.

The PWM comparator PCMP is a comparator whose output logic changes according to which of the second division voltage VR and the oscillation voltage Vosc is higher, and an output signal of the PWM comparator PCMP is fed as a PWM signal to the control circuit 22. The PWM signal is a binary signal that is high level when the second division voltage VR is higher than the oscillation voltage Vosc, and that is low level when the second division voltage VR is lower than the oscillation voltage Vosc.

Next, a detailed description will be given of the specific configuration and operation of the above-described oscillator OSC, with reference to FIGS. 2 and 3.

Figure 2:
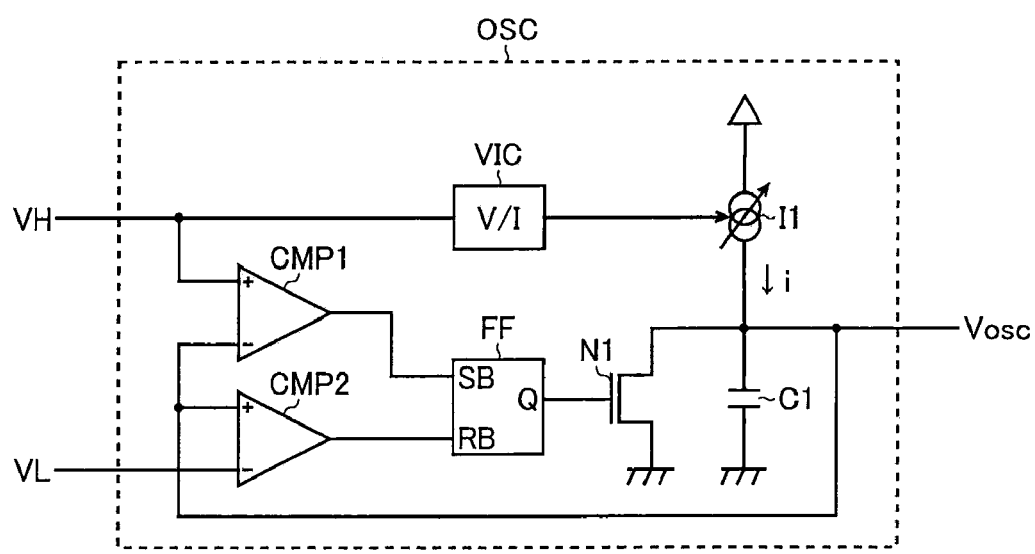
FIG. 2 is a block diagram showing an example of the configuration of an oscillator OSC.
Figure 3:
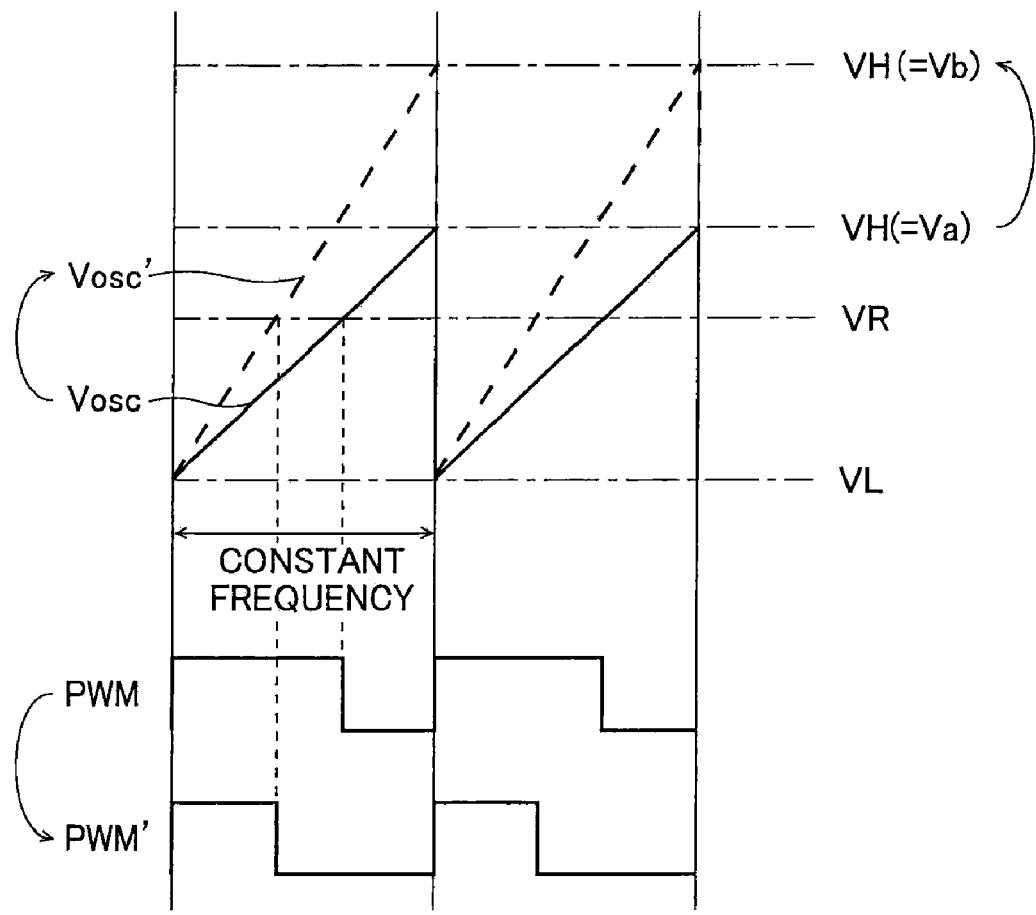
FIG. 3 is a waveform chart showing an example of the operation of the oscillator OSC.
Figure 5A:
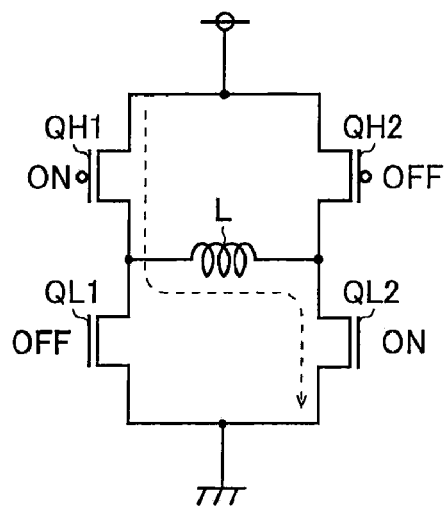
FIGS. 5A, 5B, 5C, and 5D are diagrams for illustrating drive current paths in different operation modes (i.e., forward rotation, reverse rotation, brake, and idle-running modes, respectively)
Figure 5B:
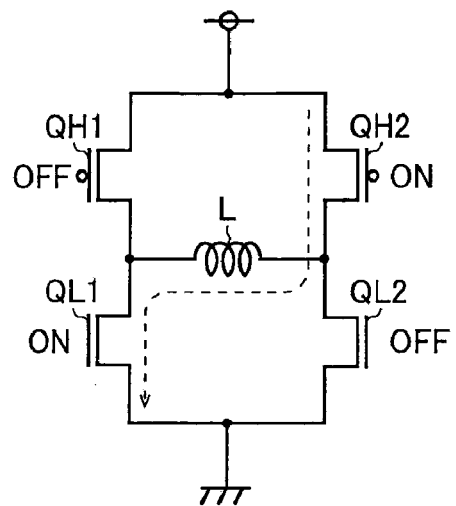
Figure 5C:
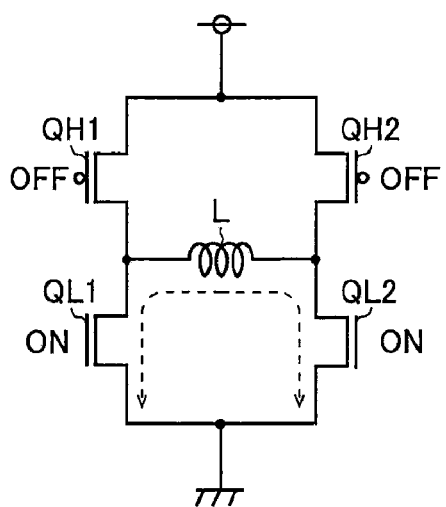
Figure 5D:
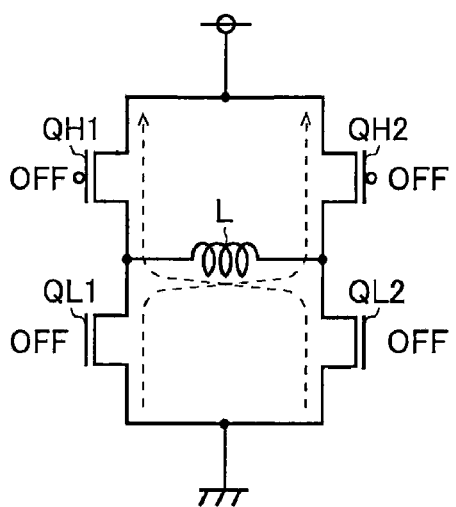

FIG. 2 is a block diagram (partly including circuit elements) showing an example of the configuration of the oscillator OSC, and FIG. 3 is a waveform chart showing an example of the operation of the oscillator OSC.

Solid lines marked with 'Vosc' in the upper part of FIG. 3 show the behavior of the oscillation voltage Vosc in the case where a voltage Va is fed as the first division voltage VH, and broken lines marked with 'Vosc'' in the upper part of FIG. 3 show the behavior of the oscillation voltage Vosc in the case where a voltage Vb (>Va) is fed as the first division voltage VH. In the lower part of FIG. 3, PWM signals generated in the above cases are marked with 'PWM' and 'PWM'', respectively.

As shown in FIG. 2, the oscillator OSC of this embodiment includes a capacitor C1, a voltage/current converter VIC, a variable current source I1, a first comparator CMP1, a second comparator CMP2, an RS flip-flop FF, and an N-channel field effect transistor N1.

One terminal of the capacitor C1 is connected to an output terminal of the variable current source I1, and is also connected as an output terminal of the oscillator OSC to an inverting input terminal (−) of the PWM comparator PCMP. That is, in the oscillator OSC of this embodiment, the terminal voltage of the capacitor C1 is derived as the oscillation voltage Vosc. The other terminal of the capacitor C1 is grounded.

The voltage/current converter VIC and the variable current source I1 supply the capacitor C1 with a charge current 'i' that is in proportion to the first division voltage VH.

The output logic of the first comparator CMP1 changes according to which of the first division voltage VH and the terminal voltage of the capacitor C1 (the oscillation voltage Vosc) is higher. The output signal of the first comparator CMP1 is a binary signal that is high level when the first division voltage VH is higher than the terminal voltage of the capacitor C1, and that is low level when the first division voltage VH is lower than the terminal voltage of the capacitor C1.

The second comparator CMP2 is a comparator whose output logic changes according to which of the terminal voltage of the capacitor C1 (the oscillation voltage Vosc) and the predetermined reference voltage VL is higher. The output signal of the second comparator CMP2 is a binary signal that is high level when the terminal voltage of the capacitor C1 is higher than the predetermined reference voltage VL, and that is low level when the terminal voltage of the capacitor C1 is lower than the predetermined reference voltage VL.

The RS flip-flop FF outputs, from its output terminal (Q), the gate signal of the transistor N1 according to the output signal of the first comparator CMP1 fed to its inverting-set terminal (SB) and the output signal of the second comparator CMP2 fed to its inverting-reset terminal (RB). More specifically, the output logic of the RS flip-flop FF continues to change such that it becomes high level when the oscillation voltage Vosc reaches the first division voltage VH, and then, when the oscillation voltage Vosc reaches the reference voltage VL, it returns to low level.

The transistor N1 is connected between one end of the capacitor C1 and a ground terminal, and functions as a discharge switch that is on/off controlled according to the output signal of the RS flip-flop FF. More specifically, the on/off state of the transistor N1 continues to change such that the transistor N1 is turned on when the oscillation voltage Vosc reaches the level of the first division voltage VH, and then when the oscillation voltage Vosc reaches the level of the reference voltage VL, it is turned off.

Through the charge/discharge control described above, as shown in the upper part of FIG. 3, the upper limit value of the oscillation voltage Vosc is variably set according to the first division voltage VH, and the lower limit value of the oscillation voltage Vosc is fixedly set according to the predetermined reference voltage VL.

As mentioned above, the current value of the charge current 'i' of the capacitor C1 (the charging speed of the capacitor C1) is increased or decreased in proportion to the first division voltage VH. More specifically, with the oscillator OSC of this embodiment, the higher the first division voltage VH (and thus the power supply voltage Vcc) is, the higher the charging speed of the capacitor C1 is; and the lower the first division voltage VH is, the lower the charging speed of the capacitor C1 is.

Through the charge current control described above, the oscillation cycle (the oscillation frequency) of the oscillator OSC is kept constant regardless of the first division voltage VH (and thus the power supply voltage Vcc).

As already mentioned, in the PWM signal generating circuit 23 of this embodiment, the voltage division ratios of the first and second voltage dividers are set to the same value ($\alpha=n/(m+n)$).

Therefore, at the PWM comparator PCMP, by comparing the second division voltage VR and the oscillation voltage Vosc, a PWM signal having a duty corresponding to the ratio between the first division voltage VH (the power supply voltage Vcc) and the second division voltage VR (the control voltage Vref) is obtained, and thus the drive voltage applied to the one end of the motor coil L (the effective value of the drive voltage applied based on the PWM control) can be variably controlled easily and in a wide range according to the control voltage Vref freely set by the user (see the lower part of FIG. 3).

In generating the control voltage Vref, correlation with the power supply voltage Vcc (in other words, the duty of the PWM signal) does not need to be taken into particular consideration, and a voltage having the same value as the drive voltage to be applied to the one end of the motor coil L may be generated as necessary by use of a resistance divider circuit or the like provided outside the device.

For example, in the case where the drive voltage that should be applied to the one end of the motor coil is 3 V, a voltage of 3 V, as is desired, may be applied as the control voltage Vref, whether the power supply voltage Vcc is 5 V or 12 V.

In the case where the power supply voltage Vcc itself should be applied to the one end of the motor coil L, the control voltage input terminal may be short-circuited to the power supply input terminal.

Next, a detailed description will be given of the H-bridge circuit 21 control operation by the control circuit 22, with reference to FIG. 4 and FIGS. 5A to 5D.

FIG. 4 is a diagram for illustrating gate-signal generating operation according to the operation mode control signals FIN and RIN, and FIGS. 5A to 5D are diagrams for illustrating drive current paths in different operation modes (i.e., forward rotation, reverse rotation, brake, and idle-running modes).

In FIG. 4, at the left end side thereof, the symbols 'FIN' and 'RIN' denote the logic states of the operation mode control signals FIN and RIN fed from outside the device, respectively, and the symbols 'QH1', 'QH2', 'QL1', and 'QL2' denote the gate-signal logic states of the transistors QH1, QH2, QL1, and QL2 provided in the H-bridge circuit 21, respectively. The symbol 'MODE' denotes the operation mode of the motor 1.

In the case where the operation mode control signal FIN is high level and the operation mode control signal RIN is low level, the control circuit 22 generates the gate signals of the transistors such that the transistors QH1 and QL2 are turned on and the transistors QH2 and QL1 are turned off to switch the operation mode of the motor 1 to the 'forward rotation mode'. The gate signals being generated in this way, a drive current is passed via the H-bridge circuit 21 through the motor coil L provided in the motor 1 along the path shown in FIG. 5A, and thus the motor 1 is driven to rotate forward.

On the other hand, in the case where the operation mode control signal FIN is low level and the operation mode control signal RIN is high level, the control circuit 22 generates the gate signals of the transistors such that the transistors QH2 and QL1 are turned on and the transistors QH1 and QL2 are turned off to switch the operation mode of the motor 1 to the 'reverse rotation mode'. The gate signals being generated in this way, a drive current is passed via the H-bridge circuit 21 through the motor coil L provided in the motor 1 along the path shown in FIG. 5B, and thus the motor 1 is driven to rotate reversely.

In the cases where the two operation modes described above are selected, the on duties of the upper-side transistors QH1 and QH2 are controlled according to the PWM signal fed from the PWM signal generating circuit 23. With such PWM driving, the drive current is repeatedly charged into and discharged from the motor coil L, and thereby the drive voltage is controlled.

Therefore, with the motor drive device of this embodiment, it is possible, regardless of the power supply voltage Vcc, to control the drive voltage applied to the one end of the motor coil L (and thus the drive current flowing through the motor coil L) to be a desired value according to the control voltage Vref set by the user.

In the case where the operation mode control signals FIN and RIN are both high level, the control circuit 22 generates the gate signals of the transistors such that the transistors QL1 and QL2 are turned on and the transistors QH1 and QH2 are turned off to switch the operation mode of the motor 1 to the 'brake mode'. The gate signals being generated in this way, a drive current is diverted from the motor coil L provided in the motor 1 via the H-bridge circuit 21 to a ground terminal along the path shown in FIG. 5C, and thus the motor 1 is braked.

In the case where the operation mode control signals FIN and RIN are both low level, the control circuit 22 generates the gate signals of the transistors such that the transistors QH1, QH2, QL1, and QL2 are all turned off to switch the operation mode of the motor 1 to the 'idle-running mode'. The gate signals being generated in this way, a current flows, according to the back electromotive force of the motor coil L provided in the motor 1, through the H-bridge circuit 21 along the path shown in FIG. 5D, and thus the motor 1 is driven to run idle.

As mentioned above, with the motor drive device of this embodiment, the drive voltage applied to the one end of the motor coil L (and thus the drive current flowing through the motor coil L) can be variably controlled easily and in a wide range according to the externally fed control voltage Vref, and thus an effective use can be made of the power supply voltage range of the device.

Furthermore, with the configuration in which the drive voltage applied to the one end of the motor coil L is controlled to be a desired value by PWM driving the switch elements of the H-bridge circuit 21, a regenerative current from the motor 1 can be made use of in an off period of the PWM control, and thus it is possible to shut down the power supply during the off period to make the device power-saving.

Moreover, with the motor drive device of this embodiment, in which field effect transistors are used as the switch elements of the H-bridge circuit 21, the response of the switch elements to on/off control can be enhanced than in the conventional configuration in which bipolar transistors are used. It is possible, however, to exploit the above described advantages of the present invention even if bipolar transistors are used as the switch elements, and thus, use of field effect transistors is not always essential to practicing the present invention.

The first embodiment described above deals with a configuration in which a single-phase DC motor is provided and driven, but this is not meant to limit the configuration of the first embodiment in any manner, and the present invention can be widely applied to motor drive devices for driving other types of motors (e.g. voice-coil motors and stepping motors).

The present invention may be carried out in any manner other than specifically described above as an embodiment, and many modifications and variations are possible within the scope and spirit of the present invention.

For example, although the embodiment described above deals with a configuration in which the upper-side transistors QH1 and QH2, among all the switch elements provided in the H-bridge circuit 21, are PWM driven, but this is not meant to limit the configuration of the present invention in any manner, and the lower-side transistors QL1 and QL2 may be PWM driven.

Figure 6:
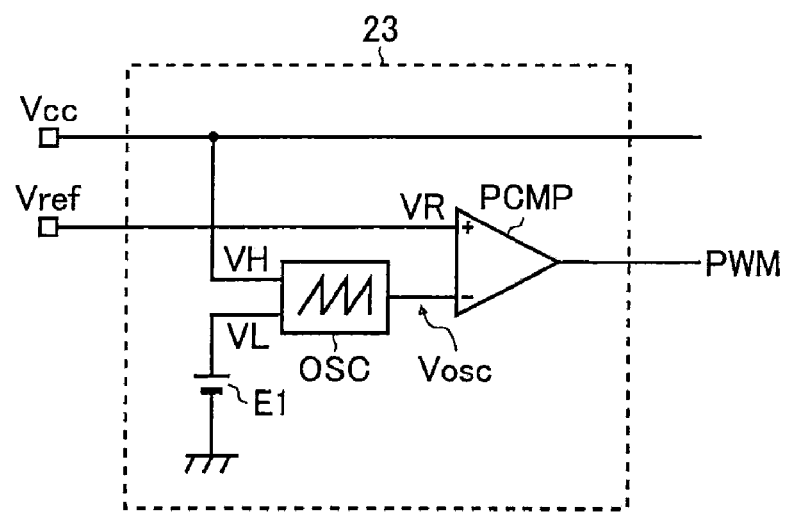
FIG. 6 is a circuit diagram showing a modified example of a PWM signal generating circuit 23.

The embodiment described above deals with a configuration in which, at the PWM signal generating circuit 23, the power supply voltage Vcc and the control voltage Vref are each divided and thereby the first division voltage VH and the second division voltage VR are generated, respectively, and the PWM signal is generated by use of these division voltages; but this is not meant to limit the configuration of the present invention in any manner. As long as the PWM comparator PCMP is used that is capable of operating at full swing between a power supply and a GND, instead of using the first division voltage VH and the second division voltage VR, the power supply voltage Vcc and the control voltage Vref may be used as they are as shown in FIG. 6. The impedance converter ADJ shown in FIG. 1 is not an essential component but may be omitted as shown in FIG. 6.

Figure 7A:
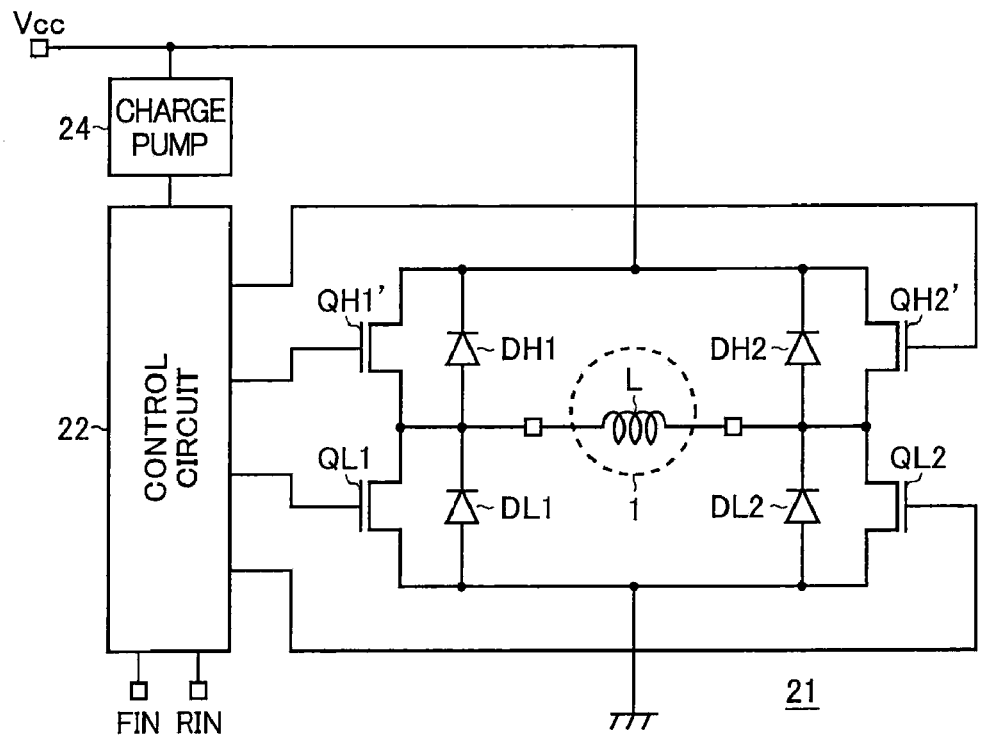
FIGS. 7A and 7B are circuit diagrams each showing a modified example of an H-bridge circuit 21.
Figure 7B:
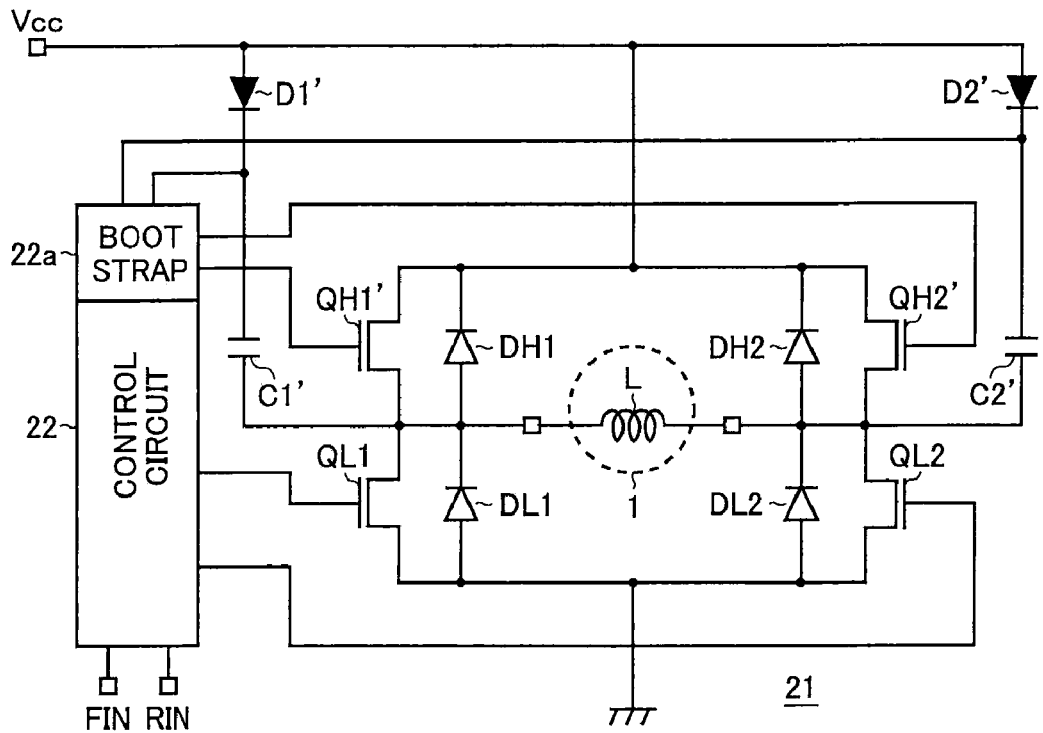

The embodiment described above deals with a configuration in which the P-channel field effect transistors QH1 and QH2 are used as the upper-side switch elements in the H-bridge circuit 21, but this is not meant to limit the configuration of the present invention in any manner, and as shown in FIGS. 7A and 7B, N-channel field effect transistors QH1' and QH2' may be used as the upper-side switch elements. In this case, as shown in FIG. 7A, a charge pump circuit 24 for stepping up the power supply voltage Vcc may be used to generate the gate voltages of the transistors QH1' and QH2', or, as shown in FIG. 7B, a bootstrap output stage 22a for bootstrapping the gate voltages of the transistors QH1' and QH2' with respect to their source voltages by using diodes D1' and D2' and capacitors C1' and C2' may be used.

The embodiment described above deals with a configuration in which the oscillation voltage Vosc is generated as desired in an analog fashion at the oscillation circuit OSC, but this is not meant to limit the configuration of the present invention in any manner, and the oscillation voltage Vosc may be generated in a digital fashion.

Figure 8:
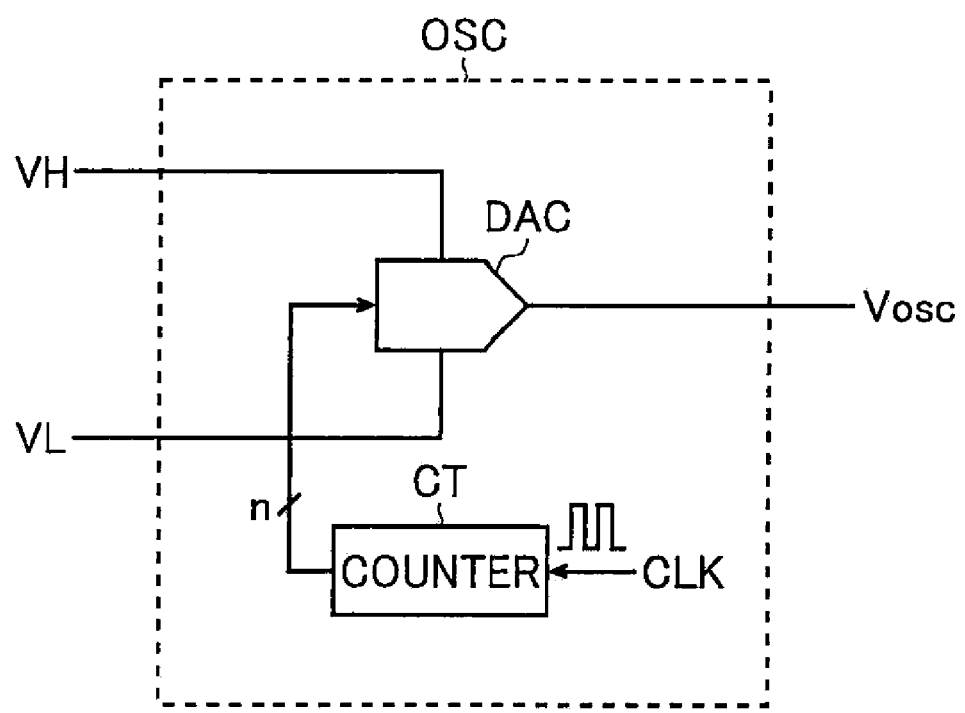
FIG. 8 is a block diagram showing a modified example of the oscillator OSC.
Figure 9:
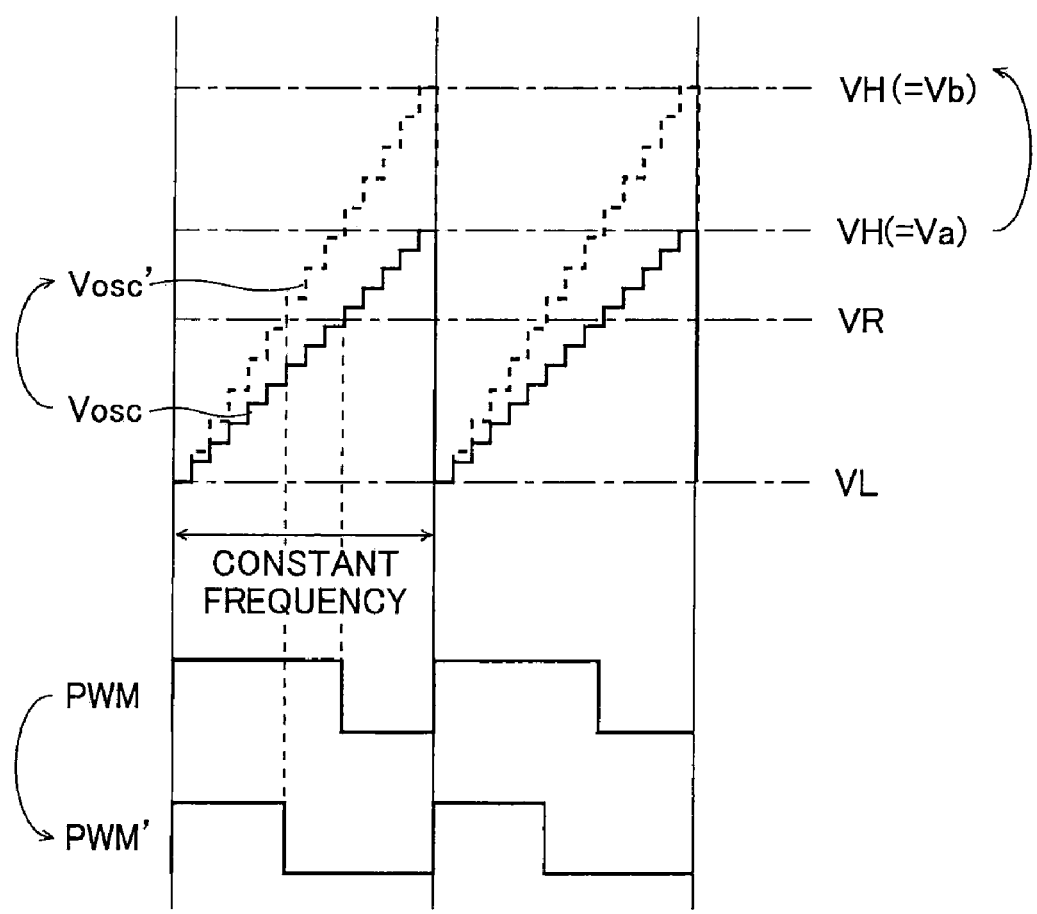
FIG. 9 is a waveform chart showing an example of the operation of the oscillator OSC.

FIG. 8 is a block diagram showing a modified example of the oscillator OSC, and FIG. 9 is a waveform chart showing an example of the operation of the oscillator OSC.

Solid lines marked with 'Vosc' in the upper part of FIG. 9 show the behavior of the oscillation voltage Vosc in the case where a voltage Va is inputted as the first division voltage VH, and broken lines marked with 'Vosc'' in the upper part of FIG. 9 show the behavior of the oscillation voltage Vosc in the case where the voltage Vb (>Va) is inputted as the first division voltage VH. In the lower part of FIG. 9, the PWM signals generated in the above cases are marked with 'PWM' and 'PWM'', respectively.

As shown in FIG. 8, the oscillator OSC of this modified example includes a free-running counter CT for counting a clock signal CLK and an n-bit digital/analog converter DAC (e.g., a 6-bit R-2R circuit) for converting the value counted by the counter CT into an analog voltage, and the oscillator OSC feeds the output of the digital/analog converter DAC as the oscillation voltage Vosc to the following PWM comparator PCMP.

To the digital/analog converter DAC, the first division voltage VH is applied as a positive power supply voltage (corresponding to an upper-limit-setting voltage of the oscillation voltage Vosc), and as a negative power supply voltage (corresponding to a lower-limit-setting voltage of the oscillation voltage Vosc), the reference voltage VL is applied.

When the counter CT counts, the oscillation voltage Vosc generated at the oscillator OSC configured as described above is stepped up in 'n' steps from the level of the reference voltage VL to the level of the first division voltage VH, and then, next time the counter CT counts, the oscillation voltage Vosc is pulled down back to the level of the reference voltage VL. This state change is repeated, giving the oscillation voltage Vosc a sawtooth waveform.

That is, the upper limit value of the oscillation voltage Vosc is variably set according to the first division voltage VH, and the lower limit value of the oscillation voltage Vosc is fixedly set according to the predetermined reference voltage VL. As shown in the lower part of FIG. 9, being determined according to the oscillation frequency of the clock signal CLK and the bit resolution of the digital/analog converter DAC, the oscillation cycle (the oscillation frequency) of the oscillation voltage Vosc is maintained constant regardless of the first division voltage VH (and thus the power supply voltage Vcc).

Thus, with the oscillator OSC of this modified example, it is possible to control the oscillation cycle of the oscillation voltage Vosc more easily and more accurately than with the one configured as shown in FIG. 2. In particular, in controlling the drivings of a plurality of motors, a configuration in which the clock signal CLK is externally fed makes it easy to synchronize the plurality of motors.

Another possible configuration is one in which the PWM signal is generated by simply comparing the oscillation voltage Vosc having a predetermined amplitude regardless of the power supply voltage Vcc and the externally fed control voltage Vref, and the thus generated PWM signal is used to PWM drive the switch elements; however, if this configuration is adopted, the user himself/herself is required to calculate the duty of the PWM signal beforehand, taking into consideration the correlation between the power supply voltage Vcc and a desired drive voltage, and then input the control voltage Vref according to the calculation result. In contrast, with the configuration of the embodiment described above, the user has only to input the control voltage Vref having the same value as a desired drive voltage. Thus, in terms of reducing strain on the user, it is preferable to adopt the configuration of the above described embodiment.

Still another possible configuration is one in which the operation mode control signals FIN and RIN themselves are PWM controlled and the switch elements are PWM controlled by use of these operation mode control signals FIN and RIN; however, if this configuration is adopted, generation means for generating the operation mode control signals FIN and RIN needs to be replaced (e.g., updating of microcomputer firmware), and this consequently forces the user to drastically change the system. In contrast, with the configuration of the embodiment described above, the user has only to replace the motor drive device with that of this embodiment, and as for the operation mode control signals FIN and RIN, the user has only to input such signals as are conventionally used. Therefore, in terms of avoiding a drastic change of the system, it is preferable that the configuration of the embodiment described above be adopted.

Next, a detailed description will be given of a second embodiment of an electric apparatus provided with a motor drive device of the present invention.

Figure 10:
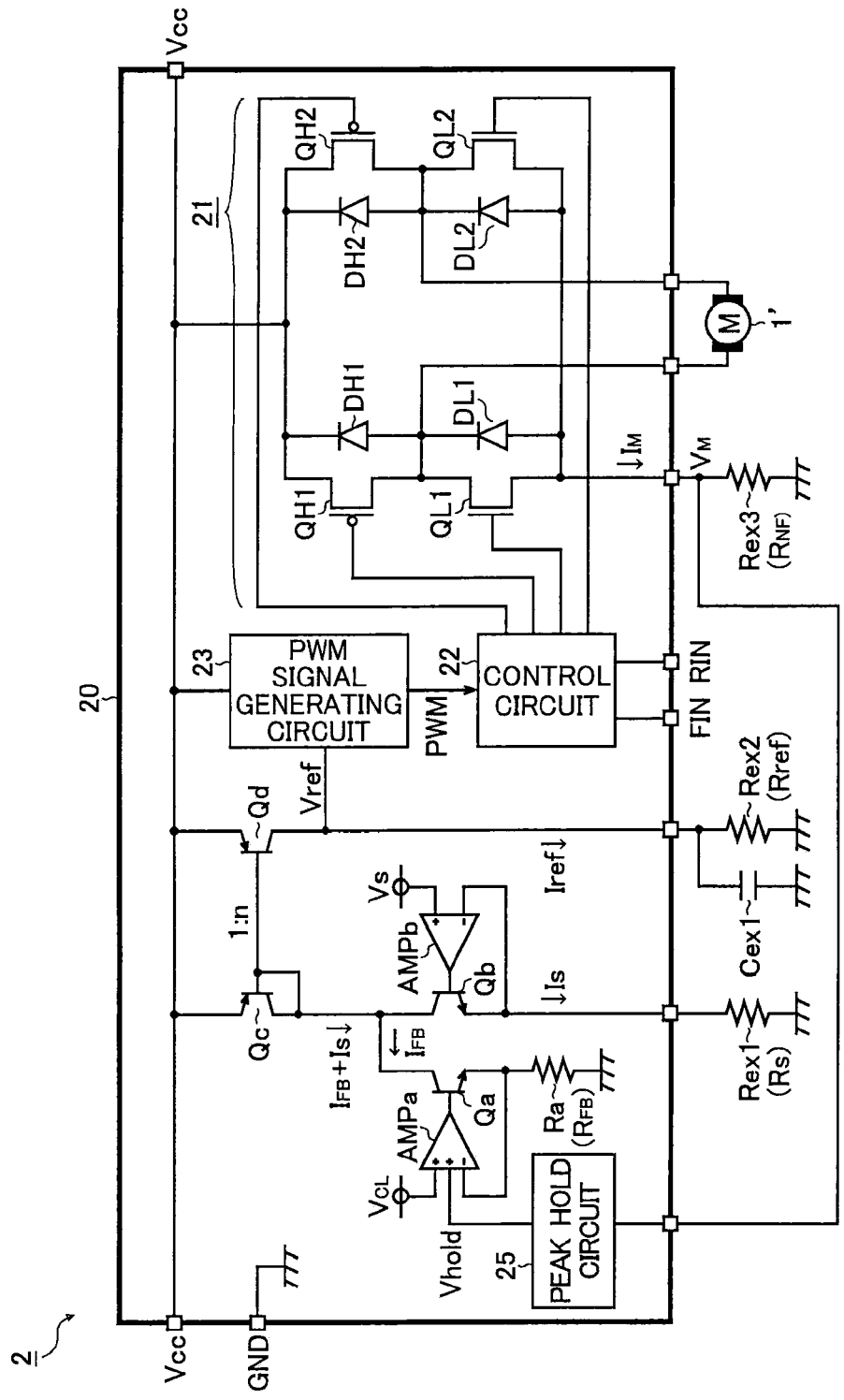
FIG. 10 is a block diagram showing a second embodiment of the electric apparatus provided with the motor drive device of the present invention.

FIG. 10 is a block diagram (partly including circuit elements) showing the second embodiment of the electric apparatus provided with the motor drive device of the present invention.

As shown in the figure, the electric apparatus of this embodiment includes a motor drive IC 20 as the motor drive device 2 for controlling the driving of a DC brush motor 1', resistors Rex1, Rex2, and Rex 3 externally connected to the motor drive IC 20, and a smoothing capacitor Cex1.

In the motor drive IC 20, a peak hold circuit 25, a differential amplifiers AMPa and AMPb, npn-type bipolar transistors Qa and Qb, and pnp-type bipolar transistors Qc and Qd are integrated in addition to the above mentioned H-bridge circuit 21, the control circuit 22, and the PWM signal generating circuit 23.

The resistor Rex3 (having a resistance of $R_{NF}$) detects a motor current $I_M$ as a monitor voltage $V_M (=I_M \times R_{NF})$ (i.e., functions as a motor current detecting resistor), and one end of the resistor Rex 3 is connected to the sources of the transistors QL1 and QL2, and is also connected to a monitor voltage input terminal of the peak hold circuit 25. On the other hand, the other end of the resistor Rex 3 is connected to a ground terminal.

The peak hold circuit 25 holds the peak level of the monitor voltage $V_M$ having a square waveform and outputs this as a hold voltage Vhold. As shown in FIG. 10, the motor drive IC 20 of this embodiment is configured such that the monitor voltage $V_M$ derived from one end of the resistor Rex 3 is conducted along a conductor outside the IC to be externally inputted to the peak hold circuit 25 via a sense terminal. In this configuration, variation in conductor resistance can be reduced as compared with in the case where the monitor voltage $V_M$ is conducted along a conductor inside the IC, and thus the rotation speed of the motor 1' can be accurately maintained at a desired value.

A first non-inverting input terminal (+) of the differential amplifier AMPa is connected to a hold voltage output terminal of the peak hold circuit 25. A second non-inverting input terminal (+) of the differential amplifier AMPa is connected to a terminal to which a control voltage $V_{CL}$ is applied (control voltage $V_{CL}$ application terminal). An inverting input terminal (−) of the differential amplifier AMPa is connected to the emitter of a transistor Qa, and is also connected to a ground terminal via a resistor Ra (having a resistance of $R_{FB}$). An output terminal of the differential amplifier AMPa is connected to the base of the transistor Qa. The differential amplifier AMPa performs opening/closing control of the transistor Qa such that the terminal voltage of the resistor Ra is equal to a lower one of the hold voltage Vhold and the control voltage $V_{CL}$. That is, the differential amplifier AMPa, the transistor Qa, and the resistor Ra described above function as a first voltage/current converting circuit that draws in, through the collector of the transistor Qa, a feedback current $I_{FB}(=I_M \times R_{NF}/R_{FB})$ corresponding to the hold voltage Vhold (and thus a peak level of the monitor voltage $V_M$) when the hold voltage Vhold is lower than the control voltage $V_{CL}$.

On the other hand, when the hold voltage Vhold is higher than the control voltage $V_{CL}$, the feedback current $I_{FB}(=V_{CL}/R_{FB})$ corresponding to the control voltage $V_{CL}$ is generated, and this limits the motor current $I_M$. This configuration is effective when the motor 1' should not be turned fully on. Incidentally, at the PWM signal generating circuit 23, an upper limit value of the on-duty of the PWM signal may be set, and with a configuration in which the control voltage $V_{CL}$ is provided, it is easy to set the upper limit value of the on-duty of the PWM signal, because the peak level of the monitoring current $I_M$ can be directly limited.

A non-inverting input terminal (+) of the differential amplifier AMPb is connected to a terminal to which a reference voltage Vs for setting a rotation speed (back electromotive voltage) of the motor 1' is applied (reference voltage Vs application terminal). An inverting input terminal (−) of the differential amplifier AMPb is connected to the emitter of the transistor Qb, and is also connected to a ground terminal via the resistor Rex1 (having a resistance of Rs). An output terminal of the differential amplifier AMPb is connected to the base of the transistor Qb. The differential amplifier AMPb performs opening/closing control of the transistor Qb such that the reference voltage Vs and the terminal voltage of the resistor Rex1 are equal. That is, the differential amplifier AMPb, the transistor Qb, and the resistor Rex1 described above function as a second voltage/current converting circuit that draws in, through the collector of the transistor Qb, a reference current Is (=Vs/Rs) corresponding to the reference voltage Vs.

The emitters of the transistors Qc and Qd are both connected to a terminal to which the power supply voltage Vcc is applied (power supply voltage Vcc application terminal). The bases of the transistors Qc and Qd are both connected to the collector of the transistor Qc. The collector of the transistor Qc is connected to the collectors of the transistors Qa and Qb. That is, the transistors Qc and Qd function as a current mirror circuit that mirrors a sum current ($I_{FB}$+Is) of the above mentioned feedback current $I_{FB}$ and the reference current Is in a predetermined ratio (1:n) so as to generate a control current Iref (=n×($I_{FB}$+Is)).

The resistor Rex2 (having a resistance of Rref) generates the control voltage Vref (=Iref×Rref) by converting the control current Iref to a voltage. One end of the resistor Rex2 is connected to the collector of the transistor Qd and is also connected to the control voltage application terminal of the PWM signal generating circuit 23, and the other end of the resistor Rex2 is connected to a ground terminal.

The smoothing capacitor Cex1 is connected in parallel to the resistor Rex2 and stabilizes the control voltage Vref. The provision of this smoothing capacitor Cex1 makes it possible to reduce variation of the control voltage Vref, and thus the rotation speed of the motor 1' can be maintained accurately at a desired value. In the case where the smoothing capacitor Cex1 is provided, the above described peak hold circuit 25 may be omitted.

In the motor drive device 2 configured as described above, the resistor Rex3 (functioning as a motor current detecting resistor), the peak hold circuit 25, the first voltage/current converting circuit (i.e., the differential amplifier AMPa, the transistor Qa, and the resistor Ra), the second voltage/current converting circuit (i.e., the differential amplifier AMPb, the transistor Qb, and the resistor Rex1), the current mirror circuit (i.e., the transistors Qc and Qd), the resistor Rex2, and the capacitor Cex1 function as a control voltage generating circuit that monitors the monitor current $I_M$ flowing through the motor 1' and generates the control voltage Vref such that the back electromotive voltage of the motor 1' (and thus the rotation speed of the motor 1') is maintained at a desired value.

Figure 11:
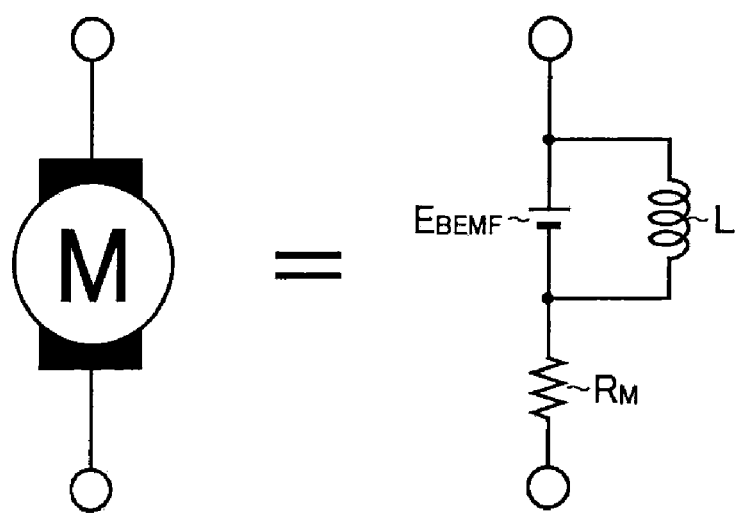
FIG. 11 is a circuit diagram equivalently showing a DC brush motor.

In FIG. 11, the DC brush motor 1' is illustrated as an equivalent circuit, and here, the following expression (1) holds for a voltage across the motor 1'.

$$R_M \cdot I_M + E_{BEMF} = \text{Vref} - (R_{ON} + R_{NF}) \cdot I_M \qquad (1)$$

In the expression (1), $R_M$ denotes the armature resistance of the motor 1', $I_M$ denotes the motor current, $E_{BEMF}$ denotes the back electromotive voltage of the motor 1', Vref denotes the control voltage (and thus the effective value of the drive voltage applied to one end of the motor 1' based on the PWM control), $R_{ON}$ denotes the sum of the on-resistances of the switch elements constituting the H-bridge circuit 21, and $R_{NF}$ denotes the resistance of the resistor Rex3.

The control voltage Vref is defined by the following expression (2).

$$Vref = (I_{FB} + Is) \cdot n \cdot Rref \qquad (2)$$
$$= \left(\frac{R_{NF} \cdot I_M}{R_{FB}} + Is\right) \cdot n \cdot Rref$$

In the above expression (2), $I_{FB}$ denotes the feedback current generated at the first voltage/current converting circuit, Is denotes the reference current generated at the second voltage/current converting circuit, 'n' denotes the mirror ratio of the current mirror circuit, Rref denotes the resistance of the resistor Rex2, and $R_{FB}$ denotes the resistance of the resistor Ra.

Therefore, the back electromotive voltage $E_{BEMF}$ of the motor 1' is defined by the following expression (3), which is obtained by substituting the expression (2) for Vref in the expression (1) and rearranging the expression (1).

$$E_{BEMF} = Vref - (R_{ON} + R_{NF}) \cdot I_M - R_M \cdot I_M \qquad (3)$$
$$= \left(\frac{R_{NF} \cdot I_M}{R_{FB}} + Is\right) \cdot n \cdot Rref - (R_{ON} + R_{NF} + R_M) \cdot I_M$$
$$= \left(\frac{n \cdot R_{NF} \cdot Rref}{R_{FB}} - R_{ON} - R_{NF} - R_M\right) \cdot I_M + n \cdot Rref \cdot Is$$

Here, the resistance Rref of the resistor Rex2 is set so as to satisfy the following expression (4).

$$Rref = \frac{R_{FB}}{n \cdot R_{NF}} \cdot (R_{ON} + R_{NF} + R_M) \qquad (4)$$

By such resistance setting, the first term of the expression (3) is zero, and thus the back electromotive voltage $E_{BEMF}$ of the motor 1' is defined by the following expression (5).

$$E_{BEMF} = n \cdot Rref \cdot Is \qquad (5)$$
$$= n \cdot Rref \cdot \frac{Vs}{Rs}$$

In the expression (5), Vs denotes the reference voltage for setting the rotation speed (and thus the back electromotive voltage) of the motor 1', and Rs denotes the resistance of the resistor Rex1.

Thus, in the motor drive device 2 of the second embodiment, regardless of the motor current $I_M$, feedback control by the control voltage Vref is performed so as to maintain the back electromotive voltage $E_{BEMF}$ (i.e., the rotation speed) given by the expression (5).

That is, the motor drive device 2 of the second embodiment achieves a type of comparison current control (i.e., electronic governor) by use of the PWM signal generating circuit 23 that generates a PWM signal having a duty corresponding to the ratio between the power supply voltage Vcc and the control voltage Vref.

With this configuration, it is possible to variably control a drive voltage applied to one end of a motor coil easily and in a wide range, and furthermore to maintain the drive voltage at a desired value.

Figure 14A:
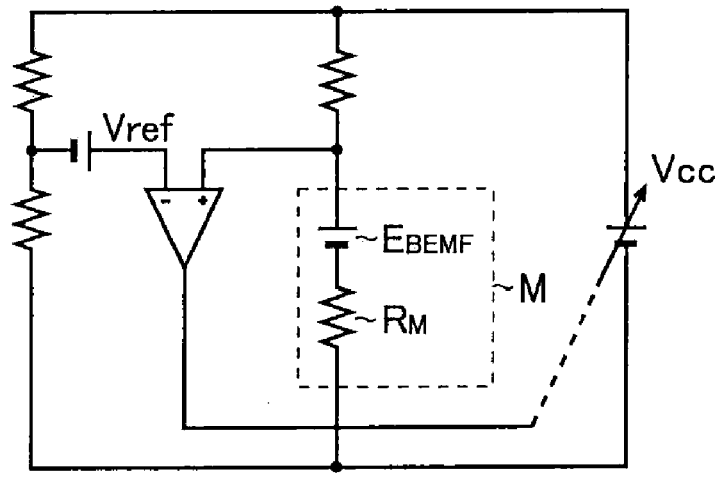
FIGS. 14A and 14B are circuit diagrams showing a conventional example of a bridge servo and a conventional example of a proportional current servo, respectively.
Figure 14B:
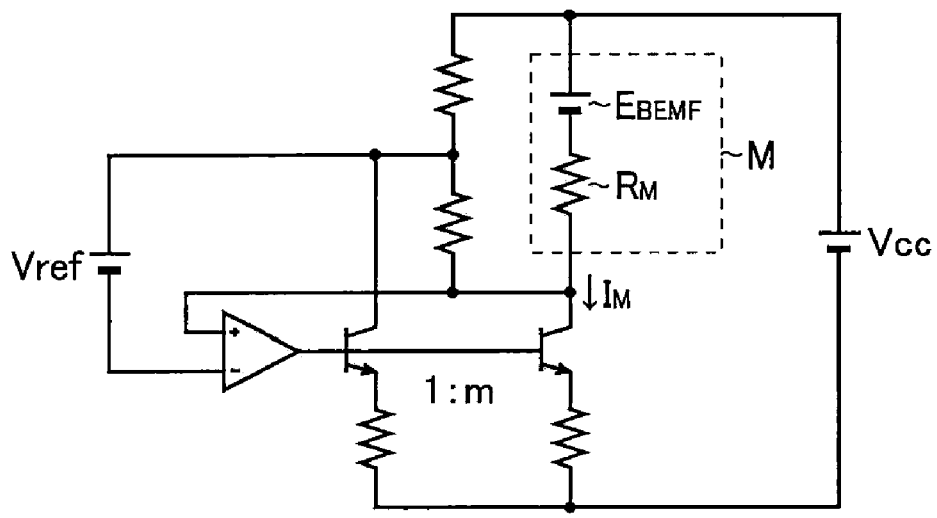

Furthermore, with the motor drive device 2 of the second embodiment, in contrast to the conventional bridge servo and comparison current servo (see FIGS. 14A and 14B), heat generation and power consumption can be reduced by PWM drive even when the motor 1' is driven with a large current. Moreover, as to controlling the switching of the rotation directions of the motor 1', as described in the first embodiment, the rotation direction of the motor 1' can be freely switched between the forward rotation and the reverse rotation according to the operation mode control signals FIN and RIN.

The second embodiment described above deals with a configuration where the resistors Rex1, Rex2, and Rex3 are externally provided for the purpose of achieving a wider scope of user setting, but this is not meant to limit the configuration of the present invention in any manner, and the resistors may be incorporated in an IC. Furthermore, for the purpose of achieving a further wider scope of user setting, the resistor Ra may be externally provided, or an external terminal may be provided for freely adjusting the reference voltage Vs or the control voltage $V_{CL}$.

The second embodiment described above deals with a configuration where the monitor voltage $V_M$ corresponding to the motor current $I_M$ is generated and the feedback current $I_{FB}$ is generated by reconverting the peak level of the monitor voltage $V_M$ to a current, but this is not meant to limit the configuration of the present invention in any manner, and a configuration may be adopted in which the feedback current $I_{FB}$ is generated directly from the motor current $I_M$ by use of a current mirror circuit. However, when this configuration is adopted, the current value of the feedback current $I_{FB}$ is adjusted according to the mirror ratio of the current mirror circuit, and thus accuracy may suffer when the mirror ratio is high. Therefore, in view of improving the accuracy of and facilitating the adjustment of the feedback current $I_{FB}$, it is preferable to adopt the second embodiment described above.

Figure 12:
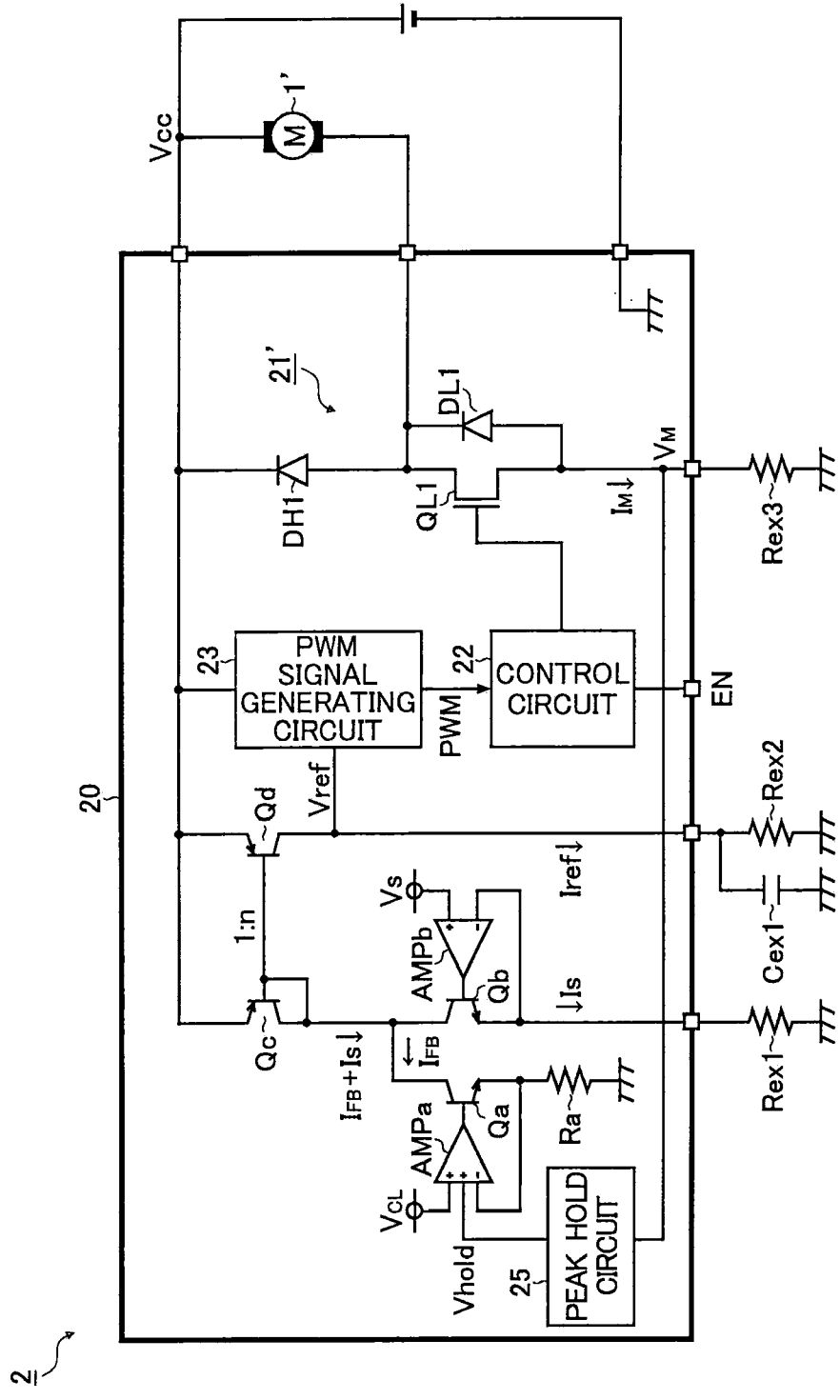
FIG. 12 is a block diagram showing a modified example of the second embodiment.
Figure 13:
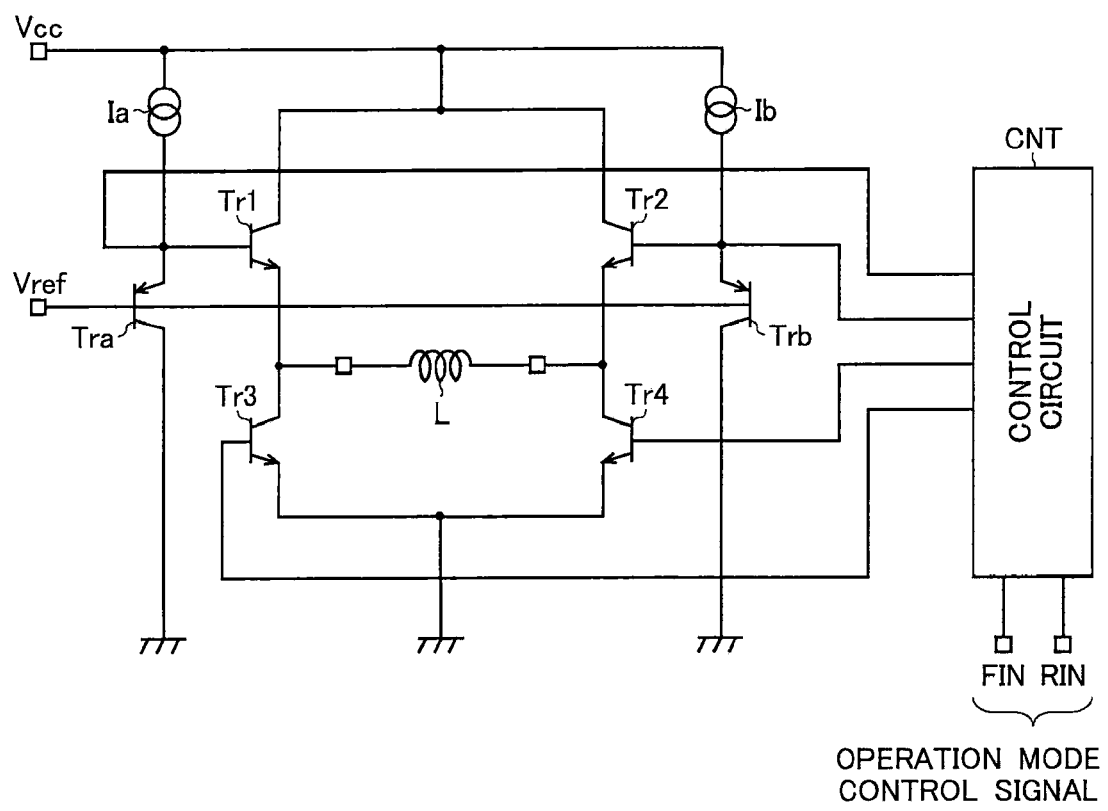
FIG. 13 is a circuit diagram showing a conventional example of a motor drive device.

The second embodiment described above deals with a configuration where the H-bridge circuit 21 (a full-bridge circuit) is used as the output stage of the motor drive IC 20, but this is not meant to limit the scope of the application of the present invention in any manner, and a configuration may be adopted in which a half bridge circuit 21' having two switch elements (in FIG. 12, a diode DH1 and a transistor QL1) connected in a totem pole configuration to the motor 1' (i.e., to the motor coil provided therein) is used as shown in FIG. 12.

According to the present invention, it is possible to variably control a drive voltage applied to one end of a motor coil easily and in a wide range, and further to maintain the drive voltage at a desired value.

The present invention offers an art that is useful in realizing a motor drive device for controlling the driving of a motor and an electronic apparatus using this in which the rotation speed of the motor can be set easily and in a wide range, and the drive voltage can be maintained at a desired value.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A motor drive device, comprising:
    an output circuit provided with a switch element connected to a motor;
    a PWM signal generating circuit for generating a PWM signal having a duty corresponding to a ratio between a power supply voltage applied to the motor and a predetermined control voltage;
    a control circuit for performing on/off control of the switch element according to the PWM signal; and
    a control voltage generating circuit for monitoring a motor current flowing through the motor, and generating the control voltage such that a back electromotive voltage of the motor is maintained at a desired value.

2. The motor drive device of claim 1,
    the control voltage generating circuit including:
    a first resistor for detecting the motor current as a monitor voltage;
    a peak hold circuit for holding a peak level of the monitor voltage;
    a first voltage/current converting circuit for generating a feedback current corresponding to the peak level of the monitor voltage;
    a second voltage/current converting circuit for generating a reference current corresponding to a predetermined reference voltage;
    a current-mirror circuit for mirroring a sum current of the feedback current and the reference current in a predetermined ratio to generate a control current; and
    a second resistor for converting the control current to a voltage to generate the control voltage.

3. The motor drive device of claim 2,
    the control voltage generating circuit including a smoothing capacitor connected in parallel to the second resistor.

4. The motor drive device of claim 1,
    the output circuit being an H-bridge circuit having four switch elements connected in an H-bridge configuration with respect to a motor coil provided in the motor, and
    the control circuit selecting a switch element to be turned on according to a predetermined operation mode control signal and controlling an on-duty of the switch element according to the PWM signal.

5. The motor drive device of claim 1,
    the output circuit being a half-bridge circuit having two switch elements connected in a totem pole configuration with respect to the motor coil provided in the motor.

6. The motor drive device of claim 1,
    the PWM signal generating circuit including:
    a first voltage divider for dividing the power supply voltage in a predetermined ratio to generate a first division voltage;
    a second voltage divider for dividing the control voltage in a predetermined ratio to generate a second division voltage;
    an oscillator for generating an oscillation voltage having a constant oscillation frequency and a sawtooth or a triangular waveform an amplitude of which varies according to the first division voltage; and
    a PWM comparator an output logic of which changes according to which of the second division voltage and the oscillation voltage is higher,
    wherein
    the PWM signal generating circuit feeds as the PWM signal an output signal of the PWM comparator to the control circuit.

7. The motor drive device of claim 6,
    the oscillator including:
    a capacitor a terminal voltage of which is derived as the oscillation voltage;
    a charge current supply circuit for supplying the capacitor with a charge current that is in proportion to the first division voltage;
    a first comparator an output logic of which changes according to which of the first division voltage and the terminal voltage of the capacitor is higher;
    a second comparator an output logic of which changes according to which of the terminal voltage of the capacitor and a predetermined reference voltage is higher;
    an RS flip-flop to which an output signal of the first comparator is set-inputted and an output signal of the second comparator is reset-inputted; and
    a discharge switch that is connected between one end of the capacitor and a ground terminal, and that is on/off controlled according to an output signal of the RS flip-flop.

8. The motor drive device of claim 6,
    the oscillator further including:
    a counter for counting a clock signal; and
    a digital/analog converter for converting a value counted by the counter to an analog voltage,
    wherein
    the oscillator outputs an output of the digital/analog converter as the oscillation voltage.

9. The motor drive device of claim 8,
    the first division voltage being applied to the digital/analog converter as a positive power supply voltage and a predetermined reference voltage being applied to the digital/analog converter as a negative power supply voltage.

10. An electric apparatus, comprising:
    a motor; and
    a motor drive device for controlling driving of the motor,
    wherein
    the motor drive device includes:
    an output circuit provided with a switch element connected to the motor;
    a PWM signal generating circuit for generating a PWM signal having a duty corresponding to a ratio between a power supply voltage applied to the motor and a predetermined control voltage;
    a control circuit for performing on/off control of the switch element according to the PWM signal; and a control voltage generating circuit for monitoring a motor current flowing through the motor and generating the control voltage such that a back electromotive voltage of the motor is maintained at a desired value.

11. The electric apparatus of claim 10,
the control voltage generating circuit including:
  a first resistor for detecting the motor current as a monitor voltage;
  a peak hold circuit for holding a peak level of the monitor voltage;
  a first voltage/current converting circuit for generating a feedback current corresponding to a peak level of the monitor voltage;
  a second voltage/current converting circuit for generating a reference current corresponding to a predetermined reference voltage;
  a current-mirror circuit for mirroring a sum current of the feedback current and the reference current in a predetermined ratio to generate a control current; and
  a second resistor for converting the control current to a voltage to generate the control voltage.

12. The electric apparatus of claim 11,
the control voltage generating circuit including a smoothing capacitor connected in parallel to the second resistor.

13. The electric apparatus of claim 10,
the output circuit being an H-bridge circuit having four switch elements connected in an H-bridge configuration with respect to a motor coil provided in the motor, and
the control circuit selecting a switch element to be turned on according to a predetermined operation mode control signal, and controlling an on-duty of the switch element according to the PWM signal.

14. The electric apparatus of claim 10,
the output circuit being a half-bridge circuit having two switch elements connected in a totem pole configuration with respect to the motor coil provided in the motor.

15. The electric apparatus of claim 10,
the PWM signal generating circuit including:
  a first voltage divider for dividing the power supply voltage in a predetermined ratio to generate a first division voltage;
  a second voltage divider for dividing the control voltage in a predetermined ratio to generate a second division voltage;
  an oscillator for generating an oscillation voltage having a constant oscillation frequency and a sawtooth or a triangular waveform an amplitude of which varies according to the first division voltage; and
  a PWM comparator an output logic of which changes according to which of the second division voltage and the oscillation voltage is higher,
wherein
the PWM signal generating circuit feeds as the PWM signal an output signal of the PWM comparator to the control circuit.

16. The electric apparatus of claim 15,
the oscillator including:
  a capacitor a terminal voltage of which is derived as the oscillation voltage;
  a charge current supply circuit for supplying the capacitor with a charge current that is in proportion to the first division voltage;
  a first comparator an output logic of which changes according to which of the first division voltage and the terminal voltage of the capacitor is higher;
  a second comparator an output logic of which changes according to which of the terminal voltage of the capacitor and a predetermined reference voltage is higher;
  an RS flip-flop to which an output signal of the first comparator is set-inputted and an output signal of the second comparator is reset-inputted; and
  a discharge switch that is connected between one end of the capacitor and a ground terminal, and that is on/off controlled according to an output signal of the RS flip-flop.

17. The electric apparatus of claim 15,
the oscillator further including:
  a counter for counting a clock signal; and
  a digital/analog converter for converting a value counted by the counter into an analog voltage,
wherein
the oscillator outputs as the oscillation voltage an output of the digital/analog converter.

18. The electric apparatus of claim 17,
the first division voltage being applied to the digital/analog converter as a positive power supply voltage and a predetermined reference voltage being applied to the digital/analog converter as a negative power supply voltage.

19. The electric apparatus of claim 10,
the motor being a DC brush motor.

* * * * *